US008933914B2

(12) United States Patent
Kim et al.

(10) Patent No.: US 8,933,914 B2
(45) Date of Patent: Jan. 13, 2015

(54) FLAT DISPLAY DEVICE AND METHOD OF DRIVING THE SAME

(75) Inventors: Hak-su Kim, Daegu (KR); Myung-Jong Park, Daejeon (KR)

(73) Assignee: LG Display Co., Ltd., Seoul (KR)

( * ) Notice: Subject to any disclaimer, the term of this patent is extended or adjusted under 35 U.S.C. 154(b) by 686 days.

(21) Appl. No.: 13/212,498

(22) Filed: Aug. 18, 2011

(65) Prior Publication Data

US 2012/0044225 A1 Feb. 23, 2012

(30) Foreign Application Priority Data

Aug. 20, 2010 (KR) ........................ 10-2010-0081069

(51) Int. Cl.
*G09G 3/36* (2006.01)
*G06F 3/038* (2013.01)
*G09G 5/00* (2006.01)

(52) U.S. Cl.
CPC ...... *G09G 3/3614* (2013.01); *G09G 2310/0213* (2013.01); *G09G 2320/0247* (2013.01); *G09G 2320/106* (2013.01); *G09G 2330/021* (2013.01)
USPC ................................ 345/204; 345/87; 345/99

(58) Field of Classification Search
USPC .................... 345/76–104, 204–215, 690–699
See application file for complete search history.

(56) References Cited

U.S. PATENT DOCUMENTS 5,307,085 A * 4/1994 Nakamura ...................... 345/99
6,545,653 B1 * 4/2003 Takahara et al. ................ 345/87
7,948,466 B2 * 5/2011 Lee ............................... 345/100
2002/0005846 A1 * 1/2002 Hiroki et al. .................. 345/204
2008/0278467 A1 * 11/2008 Hwang et al. ................. 345/205
2009/0231239 A1 * 9/2009 Goden et al. ..................... 345/76
2010/0026677 A1 * 2/2010 Shikina et al. ................ 345/213
2010/0309214 A1 * 12/2010 Cho ............................. 345/589
2011/0298761 A1 * 12/2011 Seo et al. ...................... 345/204
2013/0038621 A1 * 2/2013 Choi et al. .................... 345/589
2013/0038639 A1 * 2/2013 Han et al. ...................... 345/690

FOREIGN PATENT DOCUMENTS

CN 101692323 A 4/2010

OTHER PUBLICATIONS

Chinese Office Action dated Nov. 13, 2013 for corresponding Patent Application No. 201110238345.7.

* cited by examiner

*Primary Examiner* — Patrick F Marinelli
(74) *Attorney, Agent, or Firm* — Morgan, Lewis & Bockius LLP

(57) ABSTRACT

A flat display device includes a flat panel including a plurality of gate lines; a first gate driving portion connected to odd gate lines among the plurality of gate lines; a second gate driving portion connected to even gate lines among the plurality of gate lines; a driving mode selection portion generating a driving mode signal corresponding to source output inputted thereto; and a timing control portion operating in a moving image mode or a still image mode in response to the driving mode signal, wherein the first and second gate driving portions alternately operate per a frame in the still image mode, or wherein the first and second gate driving portions alternately operate per a field in the moving image mode, in which the field is shorter than the frame.

17 Claims, 7 Drawing Sheets

FLAT DISPLAY DEVICE AND METHOD OF DRIVING THE SAME

CROSS REFERENCE TO RELATED APPLICATION

The present invention claims the benefit of Korean Patent Application No. 10-2010-0081069, filed in Korea on Aug. 20, 2010, which is hereby incorporated by reference for all purposes in its entirety.

BACKGROUND OF THE INVENTION

1. Field of the Invention

The present invention relates to a flat display device, and more particularly, to a flat display device and a method of driving the same.

2. Discussion of the Related Art

Until recently, display devices have typically used cathode-ray tubes (CRTs). Presently, many efforts and studies are being made to develop various types of flat display devices, such as liquid crystal display (LCD) devices, plasma display panels (PDPs), field emission displays, and electro-luminescence displays (ELDs), as a substitute for CRTs.

In particular, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

When the liquid crystal molecules in the LCD device are applied continuously with a constant electric field, the liquid crystal molecules are deteriorated and a DC (direct current) component causes residual images. To prevent the problems, suggested is a method that data voltages higher and lower than a common voltage are alternately applied. This method is referred to as an inversion method.

Among inversion methods, a dot inversion method is more efficient in capability of preventing image distortion, such as flicker and crosstalk, than other inversion methods. Accordingly, an LCD device adopting the dot inversion method is widely used. The dot inversion method, however, may cause increase of power consumption. Further, a gate driving portion operates when displaying still images in the same way as it does when displaying moving images. Accordingly, power consumption is caused to be increase when displaying still images.

SUMMARY OF THE INVENTION

Accordingly, the present invention is directed to a flat display device and a method of driving the same which substantially obviates one or more of the problems due to limitations and disadvantages of the related art.

An advantage of the present invention is to provide a flat display device and a method of driving the same that can reduce power consumption.

Additional features and advantages of the present invention will be set forth in the description which follows, and in part will be apparent from the description, or may be learned by practice of the invention. These and other advantages of the invention will be realized and attained by the structure particularly pointed out in the written description and claims thereof as well as the appended drawings.

To achieve these and other advantages and in accordance with the purpose of the present invention, as embodied and broadly described herein, a flat display device includes a flat panel including a plurality of gate lines; a first gate driving portion connected to odd gate lines among the plurality of gate lines; a second gate driving portion connected to even gate lines among the plurality of gate lines; a driving mode selection portion generating a driving mode signal corresponding to source output inputted thereto; and a timing control portion operating in a moving image mode or a still image mode in response to the driving mode signal, wherein the first and second gate driving portions alternately operate per a frame in the still image mode, or wherein the first and second gate driving portions alternately operate per a field in the moving image mode, in which the field is shorter than the frame.

In another aspect, a method of driving a flat display device includes operating a timing control portion in a moving image mode or a still image mode in response to a driving mode signal, wherein the flat display device comprises a plurality of gate lines, a first gate driving portion connected to odd gate lines among the plurality of gate lines, a second gate driving portion connected to even gate lines among the plurality of gate lines, a driving mode selection portion generating the driving mode signal corresponding to source output inputted thereto; and the timing control portion operating in the moving image mode or the still image mode, and wherein the first and second gate driving portions alternately operate per a frame in the still image mode, or wherein the first and second gate driving portions alternately operate per a field in the moving image mode, in which the field is shorter than the frame It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and together with the description serve to explain the principles of the invention. In the drawings.

DETAILED DESCRIPTION OF THE ILLUSTRATED EMBODIMENTS

Reference will now be made in detail to the specific embodiments of the present invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the present invention.

Exemplary embodiments of the present invention will be described with reference to FIGS. 2 to 9.

Figure 1:
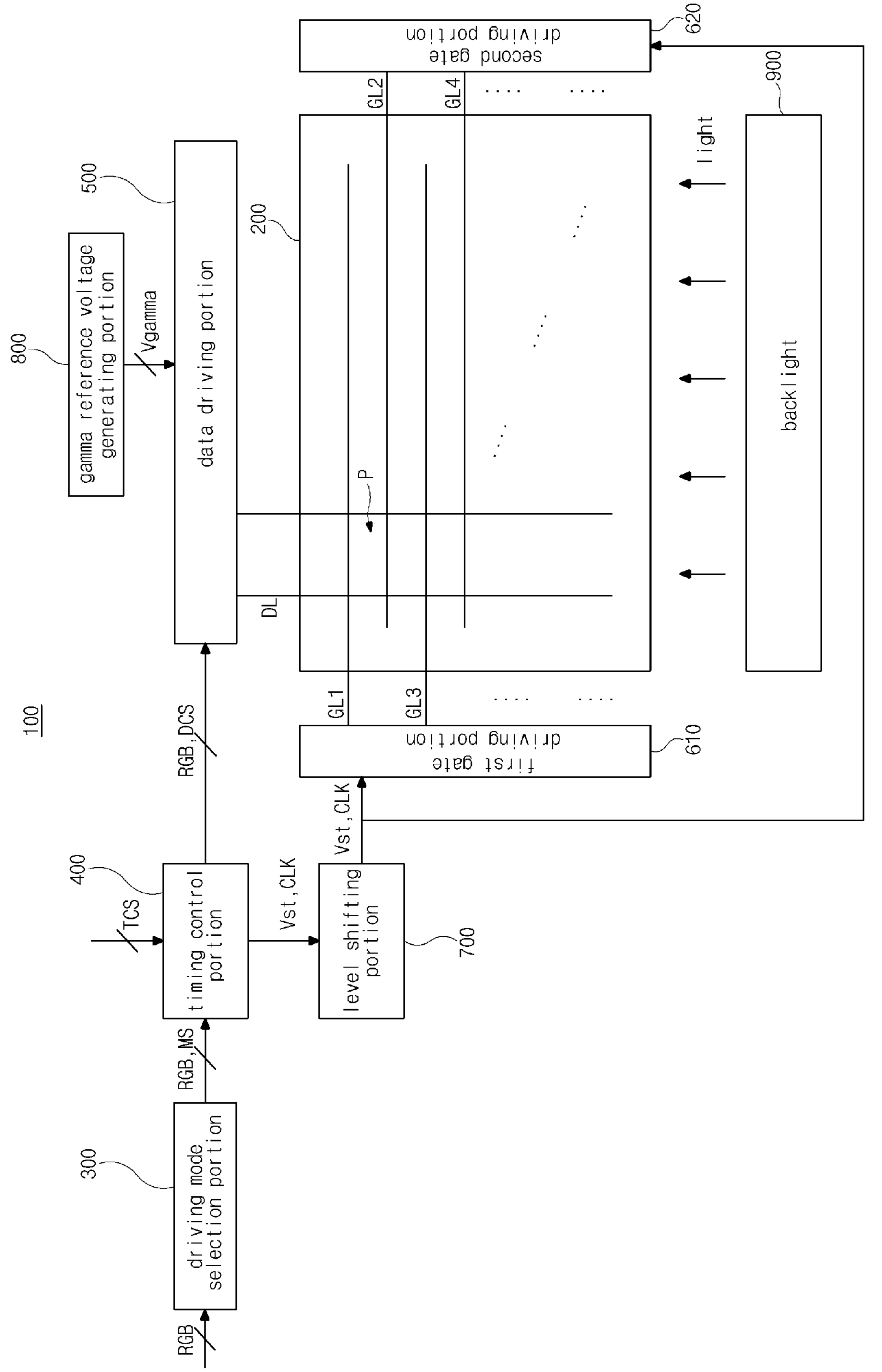
FIG. 1 is a schematic view illustrating a flat display device, such as an LCD device, according to an exemplary embodiment of the present invention.
Figure 2:
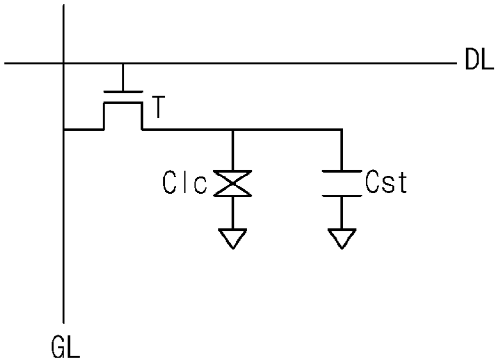
FIG. 2 is a schematic view illustrating a pixel of the flat display device according to the embodiment.

FIG. 1 is a schematic view illustrating a LCD device according to an exemplary embodiment of the present invention, and FIG. 2 is a schematic view illustrating a pixel of the LCD device according to the embodiment.

Referring to FIGS. 1 and 2, the LCD device 100 includes a flat panel 200, a backlight 900, and a driving circuit portion.

The flat panel 200 (e.g. liquid crystal panel) according to this embodiment includes a plurality of gate lines GL along a first direction (e.g. a row line direction) and a plurality of data lines DL along a second direction (e.g. a column line direction). The gate and data lines GL and DL cross each other to define a pixel P.

As shown in FIG. 2, the pixel P includes a switching transistor T, a liquid crystal capacitor Clc and a storage capacitor Cst. The switching transistor T is formed near the crossing portion of the gate and data lines GL and DL. The switching transistor T is connected to a liquid crystal capacitor Clc. The liquid crystal capacitor Cst includes a pixel electrode, a common electrode and a liquid crystal layer between the pixel and common electrodes. When a data voltage is applied to the pixel electrode and a common voltage is applied to the common electrode, an electric field is produced between the pixel and common electrodes and operates liquid crystal molecules of the liquid crystal layer. The storage capacitor Cst functions to store the data voltage.

As shown in FIG. 1, the backlight 900 supplies light to the flat panel 200. For example, a cold cathode fluorescent lamp (CCFL), an external electrode fluorescent lamp (EEFL) or a light emitting diode (LED) may be used for the backlight 900.

The driving circuit portion may include a driving mode selection portion 300, a timing control portion 400, a data driving portion 500, first and second gate driving portions 610 and 620, a level shifting portion 700, and a gamma reference voltage generating portion 800.

The driving mode selection portion 300 can receive image data signals RGB from an external system, such as a TV system and video card, and can generate a corresponding driving mode signal MS. Then, the driving mode selection portion 300 outputs the image data signals RGB and the driving mode signal MS to the timing control portion 400. The driving mode signal MS is a signal indicating a moving image mode and a still image mode.

The timing control portion 400 can receive the image data signals RGB and the driving mode signal MS. The timing control signal 400 may receive a control signal TCS, such as a horizontal synchronization signal, a vertical synchronization signal, a main clock signal, a data enable signal and the like, from the external system.

The timing control portion 400 can generate a data control signal DCS to control the data driving portion 500 using the control signal TCS.

The data control signal DCS may include a source start pulse (SSP), a source sampling clock (SSC), a source output enable signal (SOE), a polarity signal (POL) and the like. The SSP functions to indicate a starting point on a horizontal line i.e., a first pixel P, and the SSC functions to latch a data with respect to a rising edge or a falling edge thereof. The SOE functions to control output of the data driving portion 600, and the POL functions to determine a polarity of data.

The timing control portion 400 may process and output to the data driving portion 500 the image data signals RGB.

The timing control portion 400 can generate a scan pulse to control the first and second gate generating portions 610 and 620 in response to the driving mode signal MS. In more detail, when the driving mode signal MS indicates a moving image mode, a scan pulse to operate the first and second gate driving portions 610 and 620 in the moving image mode can be generated. When the driving mode signal MS indicates a still image mode, a scan pulse to operate the first and second gate driving portions 610 and 620 in the moving image mode can be generated.

The scan pulse may include a gate start pulse Vst, a clock CLK and the like. The gate start pulse is a signal to indicate start of operations of the first and second gate driving portions 610 and 620, and the clock CLK is a signal to move a signal to a next gate line GL using the gate start pulse Vst.

Each of the gate start pulse Vst and the clock CLK may be single or plural. For example, a plurality of gate start pulses Vst, such as first to fourth gate start pulses Vst1_L, Vst1_R, Vst2_L and Vst2_R, may be used, and a plurality of clocks CLK, such as first to eighth clocks CLK1 to CLK8, may be used. The first to eighth clocks CLK1 to CLK8 may be referred to as 8-phase clocks.

According to the embodiment shown in FIG. 1, the level shifting portion 700 is supplied with the scan pulse from the timing control portion 400, shifts the level of the scan pulse, and outputs the shifted scan pulse to the first and second gate driving portions 610 and 620.

The gamma reference voltage generating portion 800 can separate a high level voltage and a low level voltage to generate a plurality of gamma reference voltages Vgamma. The gamma reference voltages Vgamma are supplied to the data driving portion 500.

The data driving portion 500 supplies data voltages to the corresponding data lines DL in response to the data control signal DCS. For example, a voltage dividing circuit divides the plurality of Vgamma into a plurality of gray voltages. The plurality of gray voltages correspond to a plurality of gray levels, respectively, that are permissible to the image data signal RGB. Accordingly, the data driving portion can output a gray voltage, which corresponds to an image data signal RGB, as a data voltage to the corresponding data line DL. The data voltage is outputted in synchronization with a scan of the gate line GL and is inputted to the corresponding pixel P.

The first and second gate driving portion 610 and 620 sequentially supplies the gate lines GL with a scan pulse using the clock CLK from the level shifting portion 700. For example, the gate lines GL are sequentially scanned per frame, and the scan pulse is outputted to the gate line GL for the scan period. Accordingly, in response to a turn-on voltage of the scan pulse (i.e. a gate high voltage), the switching transistor T is turned on. A turn-off voltage (i.e. a gate low voltage) may be supplied to the gate line GL until the scan of the next frame. For example, when the gate low voltage is applied, the switching transistor T is turned off.

The first and second gate driving portions 610 and 620 start scanning the first and second gate lines GL, respectively, in response to the gate start pulses Vst from the level shifting portion 700. The gate start pulse Vst functions to indicate the start of scan of each of the first and second gate driving portions 610 and 620.

To output the scan pulse to the gate line GL, the first and second gate driving portions 610 and 620 each may include a shift register circuit. The shift register circuit may include a shifter register stage that corresponds to and outputs the scan pulse to each gate line GL.

In some embodiments, the first and second gate driving portions 610 and 620 may be formed on an array substrate of the flat panel 200 using a GIP (gate in panel) method. For example, when array elements including the gate and data lines GL and DL and the switching transistor T are formed on a display region of the array substrate, the gate driving portions 610 and 620 are formed on a non-display region of the array substrate. Alternatively, the gate driving portions 610 and 620 may be configured with a IC (integrated circuit) chip outside the flat panel 200.

Figure 3:
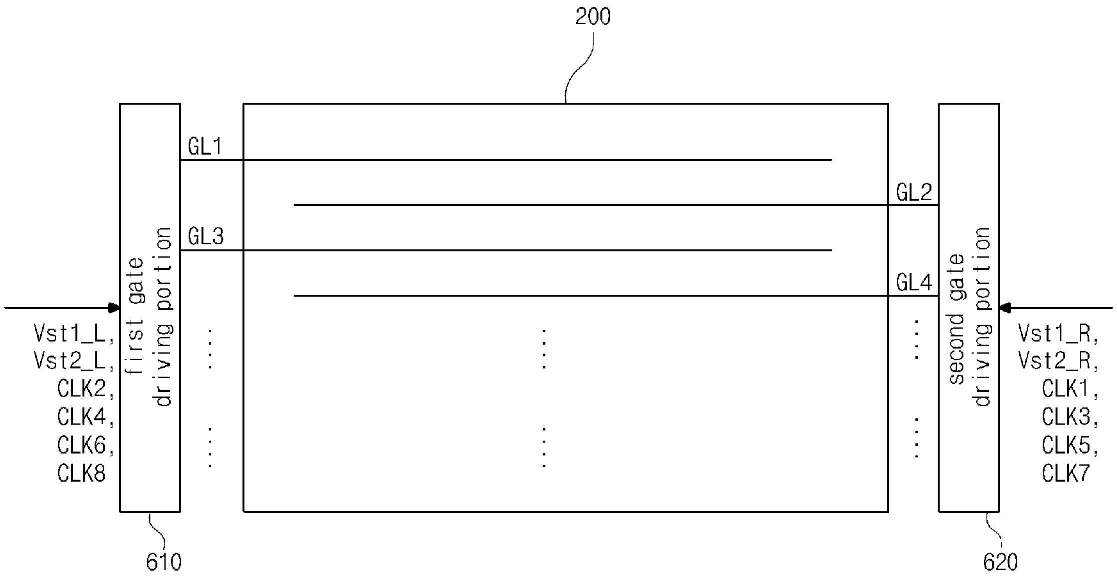
FIG. 3 is a view illustrating relation of the gate lines to the first and second gate driving portions according to the embodiment of the present invention.

FIG. 3 is a view illustrating relation of the gate lines to the first and second gate driving portions according to the embodiment of the present invention.

Referring to FIG. 3, odd gate lines GL1 and GL3 and even gate lines GL2 and GL4 are connected to one and the other of the first and second gate driving portions 610 and 620. For example, the odd gate lines GL1 and GL3 are connected to the first gate driving portion 610, and the even gate lines GL2 and GL4 are connected to the second gate driving portion 620.

The first and second gate driving portions 610 and 620 may be located at opposing sides with the flat panel 200 therebetween. For example, the first gate driving portion 610 is located at the left side of the flat panel 200, and the second gate driving portion 620 is located at the right side of the flat panel 200.

In some embodiments, each of the first and second gate driving portions 610 and 620 is supplied with four different phase clocks CLK and two different phase gate start pulses Vst. For example, the first gate driving portion 610 is supplied with the second, fourth, sixth and eighth clocks CLK2, CLK4, CLK6 and CLK8, and the first and second left gate start pulses Vst1_L and Vst2_L. The second gate driving portion 620 is supplied with the first, third, fifth and seventh clocks CLK1, CLK3, CLK5 and CLK7, and the first and second right gate start pulses Vst1_R and Vst2_R.

In particular, the second and sixth clocks CLK2 and CLK6 may be in anti-phase. Similarly, the fourth and eighth clocks CLK 4 and CLK8 may be in anti-phase, the first and fifth clocks CLK1 and CLK5 may be in anti-phase, and the third and seventh clocks CLK3 and CLK7 may be in anti-phase.

The first and second left gate start pulses Vst1_L and Vst2_L may be different in phase, and the first and second right gate start pulses Vst1_R and Vst2_R may be different in phase. This phase difference may be 1H (1 horizontal period) for a moving image, and 1H or 2H for a still image.

The first and second left gate start pulses Vst1_L and Vst2_L can indicate the start of operation of the first gate driving portion 610. The first and second right gate start pulses Vst1_R and Vst2_R can indicate the start of operation of the second gate driving portion 620.

For example, the second left gate start pulse Vst2_L makes the first gate line GL1 connected to the first gate driving portion 610 scanned, and the first left gate start pulse Vst1_L makes the third gate line GL3 connected to the first driving portion 610 scanned. In addition, the second right gate start pulse Vst2_R makes the second gate line GL2 connected to the second gate driving portion 620 scanned, and the first right gate start pulse Vst1_R makes the fourth gate line GL4 connected to the second driving portion 620 scanned.

The driving mode selection portion 300 and the timing control portion 400 according to one embodiment of the present invention are explained in more detail as follows.

The driving mode selection portion 300 can receive the image data signals RGB and can generate the corresponding driving mode signal MS. The driving mode selection signal MS can function to select a driving mode of the timing control portion 400. For example, when the image data signals RGB correspond to a moving image, the driving mode selection signal MS makes the timing control portion 400 operate in a moving image mode. When the image data signals RGB correspond to a still image, the driving mode selection signal MS makes the timing control portion 400 operate in a still image mode. The driving mode signal MS generated by the driving mode selection portion 300 is supplied to the timing control portion 400.

Figure 4:
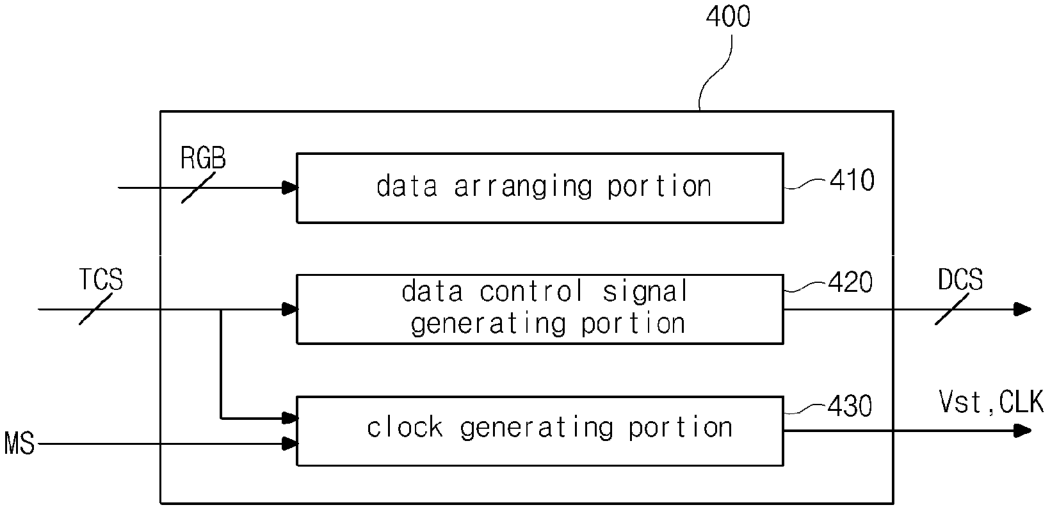
FIG. 4 is a view illustrating the timing control portion according to the embodiment of the present invention.
Figure 5:
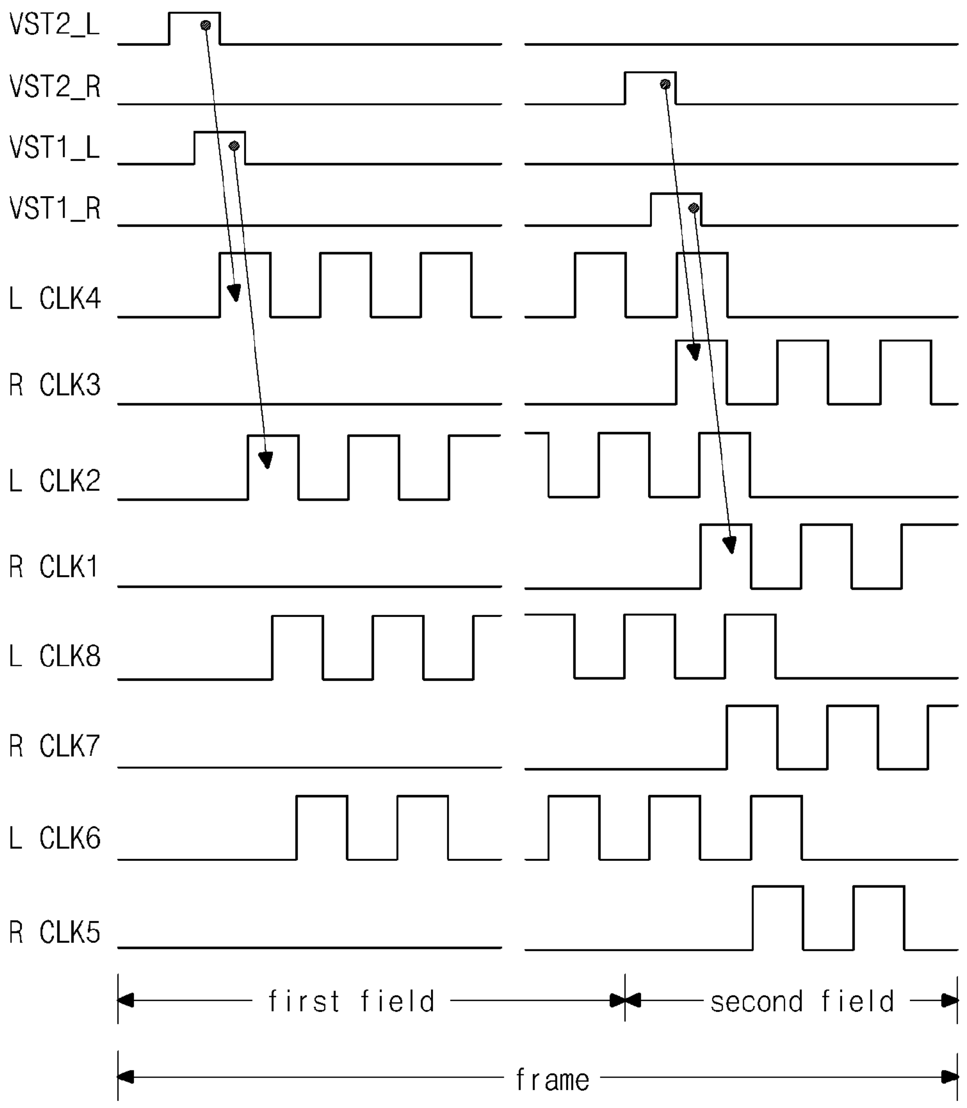
FIG. 5 is a view illustrating waveforms of signals for a moving image mode according to the embodiment of the present invention.
Figure 6:
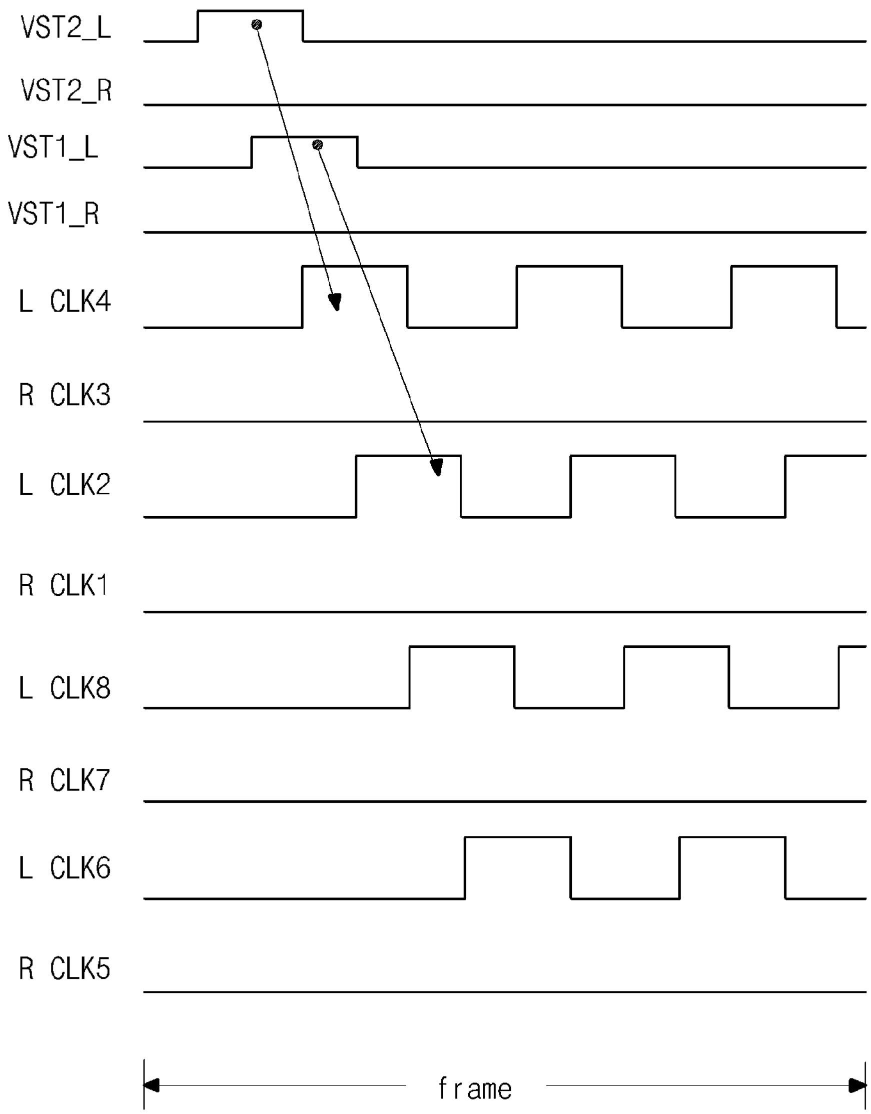
FIG. 6 is a view illustrating waveforms of signals for a still image mode according to the embodiment of the present invention.

FIG. 4 is a view illustrating the timing control portion according to the embodiment of the present invention, FIG. 5 is a view illustrating waveforms of signals for a moving image mode according to the embodiment of the present invention, and FIG. 6 is a view illustrating waveforms of signals for a still image mode according to the embodiment of the present invention.

Referring to FIG. 4, the timing control portion 400 may include a data arranging portion 410, a data control signal generating portion 420, and a clock generating portion 430.

The data arranging portion 410 can receive, arrange, and supply the image data signals RGB to the data driving portion 500.

The data control signal generating portion 420 can generate the data control signal DCS using the control signal TCS inputted thereto.

The clock generating portion 430 can generate signals to control the first and second gate driving portions 610 and 620 in response to the driving mode signal MS. The generated signals are then outputted to the level shifting portion 700.

Referring to FIG. 5, when the driving mode signal MS is a signal for the moving image mode, the clock generating portion 430 may operate in the moving image mode. In the moving image mode, both of the first and second gate driving portions 610 and 620 operate, for example, for one frame. For example, one of the first and second gate driving portions 610 and 620 finishes its operation, and then the other operates. In more detail, for example, all the gate lines GL connected to the first gate driving portion 610 are sequentially scanned, and then all the gate lines GL connected to the second gate driving portion 620 are sequentially scanned.

A period when the first gate driving portion 610 operates may be defined as a first field, and a period when the second gate driving portion 620 operates may be defined as a second field. Accordingly, one frame may be completed by sum of the first and second fields, and thus each of the first and second fields is shorter than one frame.

In some embodiments, the first gate driving portion 610 operates before the second gate driving portion 620. It should be understood, however, that the second gate driving portion 620 may operate before the first gate driving portion 610.

For the first field, the second left gate start pulse Vst2_L and the first left gate start pulse Vst1_L sequentially have a high level. By the high level of the second left gate start pulse Vst2_L, the fourth clock CLK4 and the anti-phased eighth clock CLK8 can start generating. By the high level of the first left gate start pulse Vst1_L, the second clock CLK2 and the anti-phased sixth clock CLK6 can start generating. Accordingly, the fourth, second, eighth and sixth clocks CLK4, CLK2, CLK8, and CLK6 may sequentially have a high voltage, and thus the odd gate lines GL connected to the first gate driving portion 610 are sequentially scanned.

For the second field next to the first field, the second right gate start pulse Vst2_R and the first right gate start pulse Vst1_R sequentially have a high level. By the high level of the second right gate start pulse Vst2_R, the third clock CLK3 and the anti-phased seventh clock CLK7 can start generating. By the high level of the first right gate start pulse Vst1_R, the first clock CLK1 and the anti-phased fifth clock CLK5 can start generating. Accordingly, the third, first, seventh, and fifth clocks CLK3, CLK1, CLK7, and CLK5 may sequentially have a high voltage, and thus the even gate lines GL connected to the second gate driving portion 620 are sequentially scanned.

As described above, the first gate driving portion 610 operates for the first field, and thus the odd gate lines GL are sequentially scanned and supplied with a gate high voltage. Then, the second gate driving portion 620 operates for the second field, and thus the even gate lines GL are sequentially scanned and supplied with a gate high voltage.

Referring to FIG. 6, when the driving mode signal MS is a signal for the still image mode, the clock generating portion 430 may operate in the moving image mode. In the still image mode, one of the first and second gate driving portions 610 and 620 operates, for example, for one frame. For example, the first gate driving portion 610 operates for one frame while the second gate driving portion 620 does not operate for the one frame. The second gate driving portion 620 operates for one frame while the first gate driving portion 610 does not operate for the one frame. Accordingly, the even gate lines GL or the odd gate lines are sequentially scanned and supplied with a gate high voltage.

In more detail, it is assumed that the first gate driving portion 610 operates while the second gate driving portion 620 does not operate.

In this embodiment, the second left gate start pulse Vst2_L and the first left gate start pulse Vst1_L sequentially have a high level. By the high level of the second left gate start pulse Vst2_L, the fourth clock CLK4 and the anti-phased eighth clock CLK8 can start generating. By the high level of the first left gate start pulse Vst1_L, the second clock CLK2 and the anti-phased sixth clock CLK6 can start generating. Accordingly, the fourth, second, eighth, and sixth clocks CLK4, CLK2, CLK8, and CLK6 may sequentially have a high voltage, and thus the odd gate lines GL connected to the first gate driving portion 610 are sequentially scanned.

In other words, among the gate start pulses Vst1_L, Vst1_R, Vst2_L and Vst2_R, the first and second left gate start pulses Vst1_L and Vst2_L may be generated while the first and second gate start pulses Vst1_R and Vst2_R are not generated. Accordingly, the fourth, second, eighth and sixth clocks CLK4, CLK2, CLK8 and CLK6 can be supplied to the first gate driving portion 610 while the third, first, fifth and seventh clocks CLK3, CLK1, CLK7, CLK5 are not supplied to the second gate driving portion 620.

After one of the first and second gate driving portions 610 and 620 operates for a frame, the other may operate for a predetermined next frame. In other words, the first and second gate driving portions 610 and 620 operates alternately per at least one frame, for example, per one frame.

Referring to FIGS. 5 and 6, the pulse widths of the signals in the moving image mode may be equal to or more than those in the still image mode. For example, the pulse widths in the moving image mode are equal to or two times more than those in the still image mode.

For example, in the moving image mode, the gate lines GL connected to the first or second gate driving portion 610 or 620 can operate for half a frame i.e., one field. Whereas, in the still image mode, the gate lines GL connected to the first or second gate driving portion 610 or 620 can operate for a frame. Accordingly, when the pulse width in the still image mode is two times more than that in the moving image mode, the first or second gate driving portion 610 or 620 in the still image mode operates for a frame.

According to some embodiments of the present invention described above, in the moving image mode, both of the first and second gate driving portions 610 and 620 operates for a frame. Accordingly, with respect to the frame, the timing control portion 400 generates and supplies to the first and second gate driving portions 610 and 620 the gate start pulses Vst1_L, Vst1_R, Vst2_L and Vst2_R. Further, with respect to the frame, all the gate lines GL are supplied with a gate high voltage according to the clocks CLK1 to CLK8.

In the still image mode, one of the first and second gate driving portions 610 and 620 operates for a frame. Accordingly, with respect to the frame, the timing control portion 400 generates and supplies the gate start pulses Vst1_L/Vst2_L or Vst1_R/Vst2_R to one of the first and second gate driving portions 610 and 620. Further, with respect to the frame, the gate lines GL connected to the one of the first and second gate driving portions 610 and 620 are supplied with a gate high voltage according to the corresponding clocks CLK1, CLK3, CLK5 and CLK7 or CLK2, CLK4, CLK6 and CLK8.

In addition, the first and second gate driving portions 610 and 620 alternately operate by a predetermined period, and this driving method may be referred to as an interlacing method.

Figure 7:
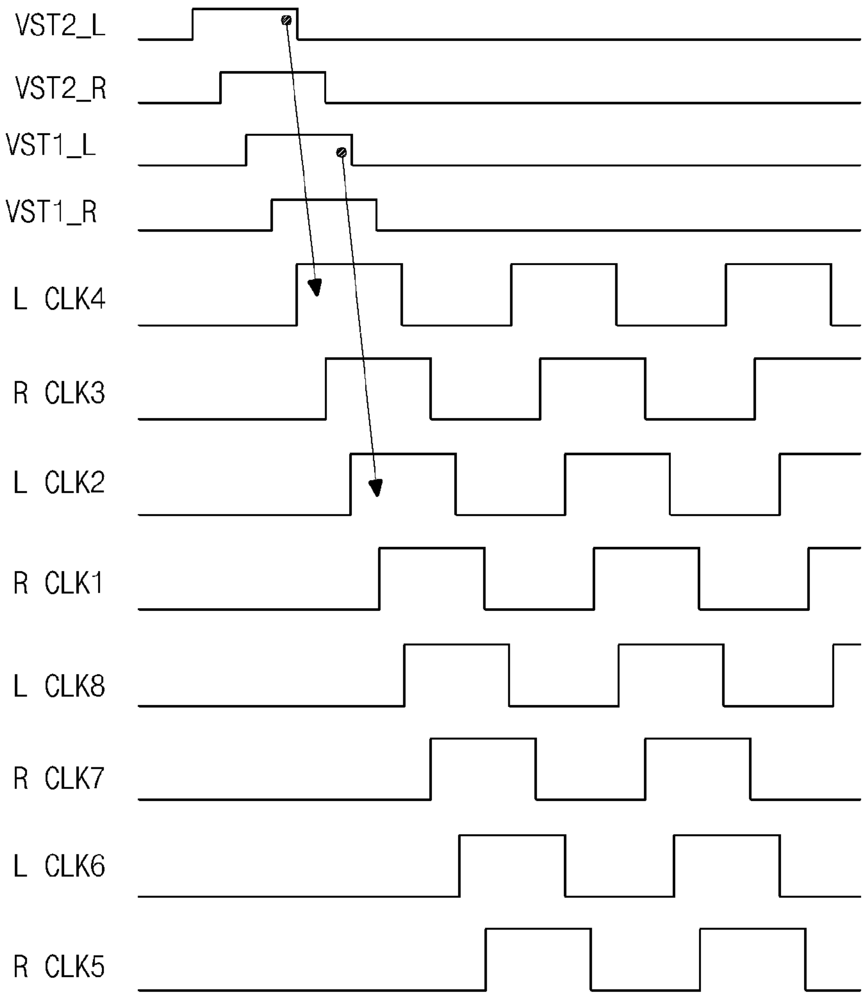
FIG. 7 Related Art
FIG. 7 is a view illustrating waveforms of signals used for a flat display device, such as an LCD device, according to the related art.

The interlacing method according to the embodiment of the present invention has advantages as follows. Referring to FIG. 7 that shows waveforms of signals used for an LCD device according to the related art. Referring to FIG. 7, in the related art, gate start pulses Vst2_L, Vst2_R, Vst1_L and Vst1_R are sequentially generated, and clocks CLK4, CLK3, CLK2, CLK1, CLK8, CLK7, CLK6 and CLK5 are applied. Accordingly, the related art LCD device consumes power in a still image mode as much as it does in a moving image mode. To prevent this, it might be configured that a data refresh rate in the still image mode is slower than that in the moving image rate, for example, the refresh rate in the still image mode is 40 Hz (Hertz) while the refresh rate in the moving image mode is 60 Hz. This, however, causes flicker due to variation of refresh rate. To prevent this flicker, it might be suggested that a size of a storage capacitor increases. Nonetheless, this causes reduction of aperture ratio.

According to additional embodiments of the present invention, a data refresh rate in the still image mode can be equal to that in the moving image mode. This can improve the flicker in the related art without reduction of aperture ratio. Further, since the display image is a still image, image breaking does not occur even when the interlacing method is used. Further, since needless operation of gate driving portions is reduced, power consumption can be reduced.

Another embodiment of the present invention is explained as follows. When the first and second gate driving portions 610 and 620 operate using the interlacing method, the flat panel 200 may operate in a dot inversion method through operating the data driving portion 500 in a column inversion method.

Figure 8:
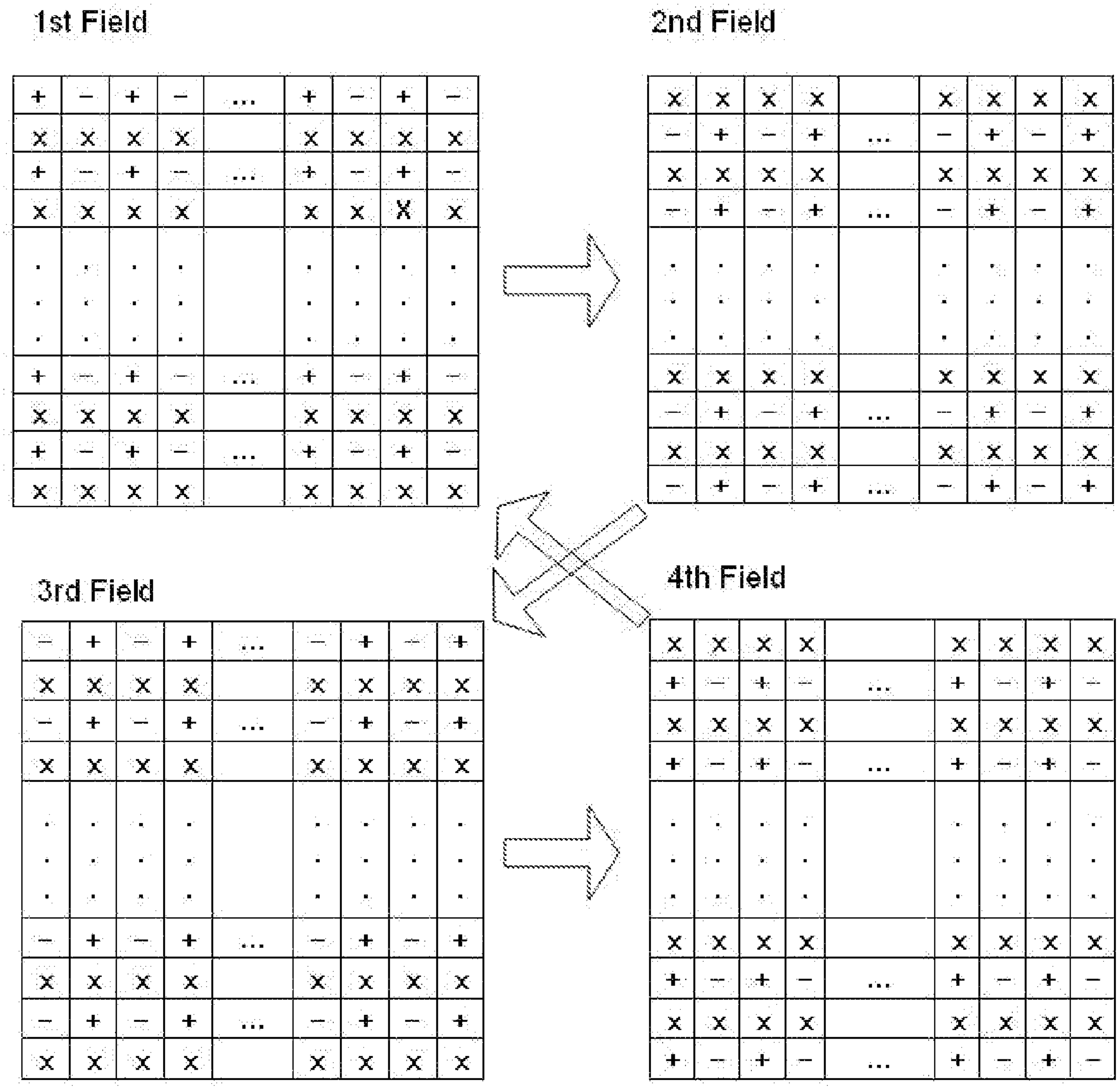
FIG. 8 is a view illustrating the flat display device operated in a dot inversion method according to another exemplary embodiment of the present invention.

Referring to FIG. 8, for example, for a first field, source output having a positive polarity (+) are applied on a first column line while source output having a negative polarity (−) are applied on a second column line. Then, for a second field, source output having a negative polarity (−) are applied on the first column line while source output having a negative polarity (−) are applied on the second column line.

In other words, when each of the first and second gate driving portions 610 and 620 operates, each column line is applied with source output of the same polarity. Accordingly, the data driving portion 500 operates in a column inversion method. Polarities of source output, however, are finally inverted per column line and per row line on the flat panel 200, and thus the flat panel 200 operates in a dot inversion method.

In addition, according to some embodiments of the present invention, a polarity of an source output inputted to a pixel in an operation of the first gate driving portion 610 is opposite to a polarity of an source output inputted to the pixel in a next operation of the first gate driving portion 610. In Similarly, a polarity of an source output inputted to a pixel in an operation of the first second driving portion 620 may be opposite to a polarity of an source output inputted to the pixel in a next operation of the second gate driving portion 620.

Figure 9:
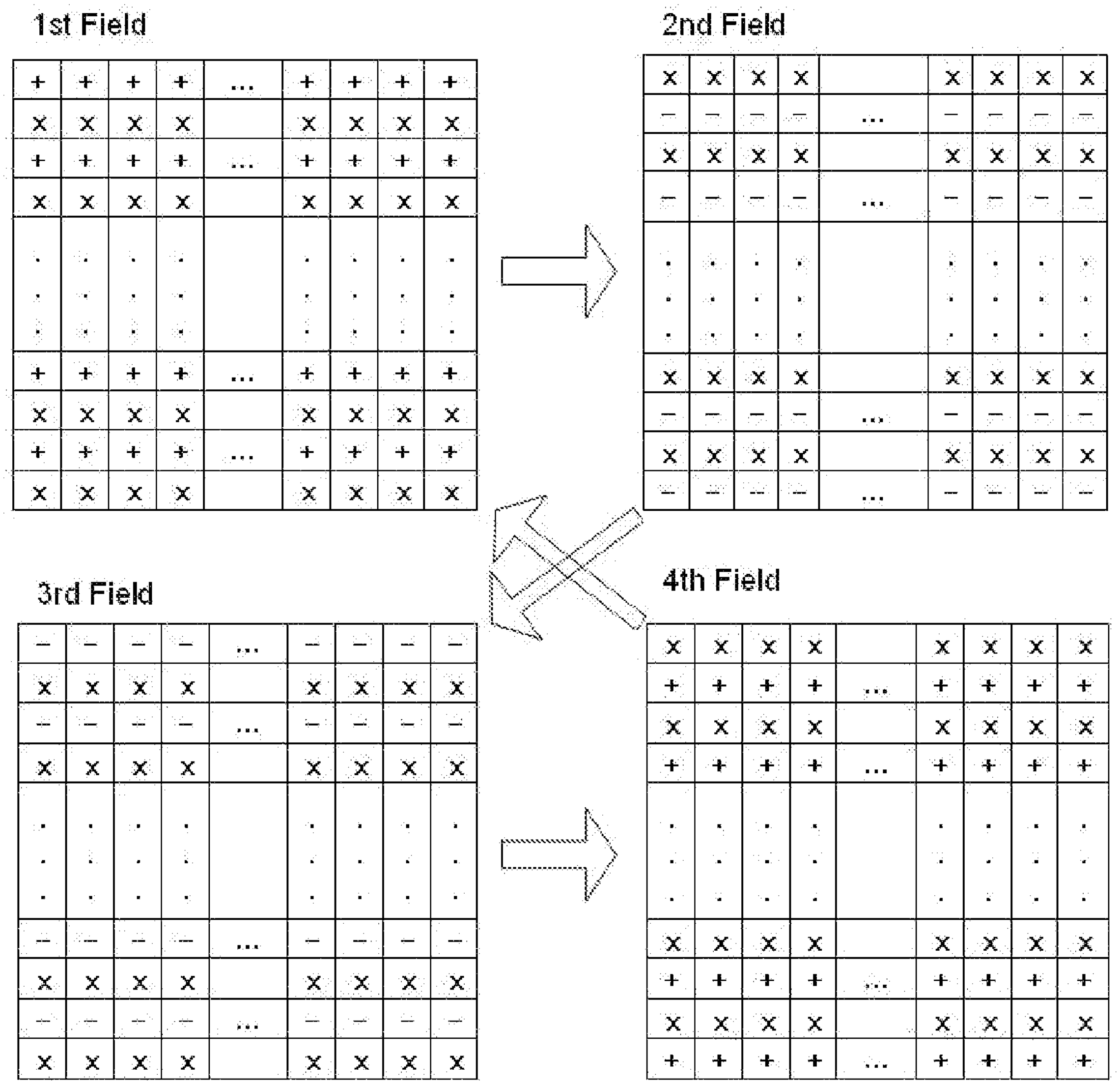
FIG. 9 is a view illustrating the flat display device operated in a line inversion method according to another embodiment of the present invention.

Another embodiment of the present invention is explained as follows. Referring to FIG. 9, the data driving portion 500 operates in a frame inversion method, and the flat panel 200 operates in a line inversion method.

As described above, the LCD device according to the embodiment can improve display quality with low power consumption. Further, power consumption in displaying a still image can be less than that in displaying a moving image.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A flat display device, comprising:
- a flat panel including a plurality of gate lines;
- a first gate driving portion connected to odd gate lines among the plurality of gate lines;
- a second gate driving portion connected to even gate lines among the plurality of gate lines;
- a driving mode selection portion generating a driving mode signal corresponding to source output inputted thereto; and
- a timing control portion operating in a moving image mode or a still image mode in response to the driving mode signal,
- wherein the first and second gate driving portions alternately operate per a frame in the still image mode, and wherein the first and second gate driving portions alternately operate per a field in the moving image mode such that the first gate driving portion sequentially scans the odd gate lines connected thereto for a field and then the second gate driving portion sequentially scans the even gate lines connected thereto for a next field, in which each of the fields is shorter than the frame,
- wherein the timing control portion further comprises a clock generating portion that generates a gate start pulse and a clock corresponding to the driving mode signal, and
- wherein pulse widths of the gate start pulse and the clock in the still image mode are larger than in the moving image mode.

2. The device according to claim 1, wherein the clock generating portion generates the gate start pulse and the clock,
- wherein, in the moving image mode, the first gate driving portion operates for a first field, and the second gate driving portion operates for a second field, and
- in the still image mode, one of the first and second gate driving portions operates for a frame.

3. The device according to claim 2, wherein, in the still image mode, the first and second gate driving portions operate alternately per at least one frame.

4. The device according to claim 1, wherein the first and second gate driving portions are located at opposing sides with the flat panel therebetween.

5. The device according to claim 1, wherein the flat display device is a liquid crystal display.

6. The device according to claim 1, wherein each of the fields is half the frame.

7. The device according to claim 1, wherein the pulse widths of the gate start pulse and the clock in the still image mode are two times larger than in the moving image mode.

8. A method of driving a flat display device comprising:
- operating a timing control portion in a moving image mode or a still image mode in response to a driving mode signal,
- wherein the flat display device comprises a flat panel comprising a plurality of gate lines, a first gate driving portion connected to odd gate lines among the plurality of gate lines, a second gate driving portion connected to even gate lines among the plurality of gate lines, a driving mode selection portion generating the driving mode signal corresponding to source output inputted thereto, and the timing control portion operating in the moving image mode or the still image mode,
- wherein the first and second gate driving portions alternately operate per a frame in the still image mode, and wherein the first and second gate driving portions alternately operate per a field in the moving image mode such that the first gate driving portion sequentially scans the odd gate lines connected thereto for a field and then the second gate driving portion sequentially scans the even gate lines connected thereto for a next field, in which each of the fields is shorter than the frame,
- wherein a gate start pulse and a clock corresponding to the driving mode signal are generated by the timing control portion, and
- wherein pulse widths of the gate start pulse and the clock in the still image mode are larger than in the moving image mode.

9. The method according to claim 8,
- wherein, in the moving image mode, the first gate driving portion operates for a first field and the second gate driving portion operates for a second field, and
- in the still image mode, one of the first and second gate driving portions operate for a frame.

10. The device according to claim 8, wherein, in the still image mode, the first and second gate driving portions operate alternately per at least one frame.

11. The method according to claim 8, wherein the first and second gate driving portions are located at opposing sides with the flat panel therebetween.

12. The method according to claim 8, wherein source output having one of positive and negative polarities is applied on a column line when the first gate driving portion operates, and wherein source output having the other of positive and negative polarities is applied on the column line when the second gate driving portion operates.

13. The method according to claim 12, wherein the polarity of the source output in the operation of the first gate driving portion is opposite to that of a source output in a next operation of the first gate driving portion, and wherein the polarity of the source output in the operation of the second gate driving portion is opposite to that of a source output in a next operation of the second gate driving portion.

14. The method according to claim 12, wherein the polarity of the source output on the column line is opposite to a polarity of a source output on an adjacent column line.

15. The method according to claim 8, wherein the flat display device is a liquid crystal display.

16. The method according to claim 8, wherein each of the fields is half the frame.

17. The method according to claim 8, wherein the pulse widths of the gate start pulse and the clock in the still image mode are two times larger than in the moving image mode.

* * * * *